United States Patent [19]
Bladen et al.

[11] Patent Number: 5,560,831
[45] Date of Patent: Oct. 1, 1996

[54] METHOD AND APPARATUS FOR TREATING WATER USED FOR WASHING AGRICULTURAL PRODUCTS INCLUDING COAGULATION AND OZONE TREATMENT

[75] Inventors: Donald H. Bladen, Vero Beach; Paul P. Nunn; Paul J. Nunn, both of Fort Pierce, all of Fla.

[73] Assignee: Water Technology Resources, Inc., Fort Pierce, Fla.

[21] Appl. No.: 281,455

[22] Filed: Jul. 27, 1994

[51] Int. Cl.⁶ .................................. C02F 1/52; C02F 1/78
[52] U.S. Cl. .......................... 210/704; 134/111; 210/167; 210/195.1; 210/712; 210/760; 210/805; 210/806
[58] Field of Search .................. 210/197, 195.1, 210/167, 192, 202, 257.1, 259, 260, 513, 521, 712, 760, 764, 804, 805, 806, 194, 723, 770, 705; 422/24, 28, 186.07, 186.12; 15/3.12, 3.13, 3.14, 3.15; 134/104.4, 109, 111

[56] References Cited

U.S. PATENT DOCUMENTS

| | | | |
|---|---|---|---|
| 1,696,704 | 12/1928 | Zellner | 210/167 |
| 3,855,124 | 12/1974 | Lapidot . | |
| 3,945,918 | 3/1976 | Kirk . | |
| 4,028,233 | 6/1977 | Quentin et al. . | |
| 4,108,768 | 8/1978 | Sebelik et al. . | |
| 4,224,148 | 9/1980 | Lindman et al. | 210/714 |
| 4,340,473 | 7/1982 | Lindman et al. | 210/173 |
| 4,425,238 | 1/1984 | Degen et al. | 210/666 |
| 4,659,462 | 4/1987 | Chapman | 210/202 |
| 4,744,903 | 5/1988 | McAninch et al. | 210/705 |
| 4,744,904 | 5/1988 | McAninch et al. | 210/705 |
| 4,790,943 | 12/1988 | Dunn et al. | 210/705 |
| 4,966,713 | 10/1990 | Keys et al. | 210/705 |
| 5,053,140 | 10/1991 | Hurst | 210/712 |
| 5,059,317 | 10/1991 | Marius et al. | 210/202 |
| 5,071,587 | 12/1991 | Perman | 252/181 |
| 5,077,314 | 12/1991 | Philips et al. | 514/640 |
| 5,097,556 | 3/1992 | Engel et al. . | |
| 5,178,755 | 1/1993 | LaCrosse | 210/195.1 |
| 5,181,399 | 1/1993 | Engel et al. . | |
| 5,207,921 | 5/1993 | Vincent | 210/704 |
| 5,238,579 | 8/1993 | Shibley | 210/716 |
| 5,256,299 | 10/1993 | Wang et al. | 210/664 |

OTHER PUBLICATIONS

David Sheets, *Gonna Wash That Waste Out*, The Tribune, Dec. 29, 1989, at B4, B8.
Brad Tukey, *Overview of Ozone Use at Snokist Growers*, Washington State University Tree Fruit Postharvest Journal, vol. 4, No. 1 (Jun. 1993).
Declaration of Donald H. Bladen.

*Primary Examiner*—Joseph W. Drodge
*Attorney, Agent, or Firm*—Quarles & Brady

[57] ABSTRACT

A method and apparatus for washing agricultural products generates and purifies a wastewater. The wastewater is fed to a first coagulation compartment. A first compartment overflow contains a relatively higher amount of the coagulant and of coagulated contaminants than does the first compartment underflow. The first compartment underflow is fed to at least a second coagulation compartment. A compartment overflow and a compartment underflow are provided in the second compartment and in any successive compartments. The compartment overflow contains a relatively higher amount of the coagulant and of the contaminants than does the compartment underflow. A source of ozone is generated by an ozone generator. The compartment underflow from the last of the coagulation compartments is treated with ozone so that ozonized final compartment underflow provides a source of de-contaminated wastewater. The final compartment underflow is recycled to wash the agricultural products, and the final compartment overflow is again treated with coagulant and processed to remove contaminants.

31 Claims, 3 Drawing Sheets

METHOD AND APPARATUS FOR TREATING WATER USED FOR WASHING AGRICULTURAL PRODUCTS INCLUDING COAGULATION AND OZONE TREATMENT

FIELD OF THE INVENTION

This invention relates generally to a method and apparatus for washing agricultural products, including fruits and vegetables. In particular, the present invention is especially suited to cleaning wastewater generated by washing stations in citrus fruit and vegetable packing facilities. More particularly, the invention relates to an integrated system and method for washing the outside surfaces of citrus and vegetables wherein the wastewater generated is collected and de-contaminated, and then recycled to the fruit and vegetable washing station.

BACKGROUND OF THE INVENTION

With increased attention and regulatory resources being directed to the establishment and maintenance of uncontaminated rivers, lakes, and ground water, it has become imperative for the producer of wastewater to employ a treatment system which avoids the introduction of prohibited levels of contaminants into the environment.

In many states groundwater control regulations of exacting strictness have been enacted. Commonly, these regulations require the immediate report and remediation of any discharges of organic and inorganic waste, soluble heavy metals, petroleum products, or bacteriologically contaminated materials which exceed regulatory levels. Although it is always an option to transport the contaminated wastewater to an outside authorized disposal facility, such transportation is usually prohibitively expensive due to the large volume of wastewater involved. Furthermore, transportation of waste deemed hazardous may require prior authorization and permitting from regulatory authorities.

Alternatively, various industrial wastewaters containing harmful or hazardous substances can be properly pretreated for resource recovery or pollution load reduction before being discharged to municipal sewers or receiving waters. However, if a wastewater stream is sufficiently cleaned so that it can be discharged into the environment, then it may as well be processed so that it may be recycled and reused in the particular industrial process that generates the wastewater.

Wastewaters often contain constituents such as pesticides, organics, dirt, heavy metals, microorganisms, and soluble and insoluble inorganics, for instance. Many conventional unit processes address the elimination of these contaminants. For example, some of the unit processes used in the prior art include chemical coagulation, flocculation, oxidation, sedimentation clarification, flotation clarification, air stripping towers, granular activated carbon filtration, sand filtration, ozonization, ultraviolet light treatment, chlorination, reverse osmosis, ultrafiltration, microfiltration, ion exchange, distillation, etc. See, e.g. U.S. Pat. Nos. 3,855,124; 3,945,918; 4,028,233; 4,108,768; 4,224,148; 4,340,473; 4,425,238; 4,659,462; 5,059,317; 5,071,587; 5,077,314; 5,178,755; 5,238,579; and 5,256,299. The disclosures of these patents referred to above are incorporated by reference as if fully set forth herein.

Citrus, fruit, and vegetable packing facilities are a large user of water, and concomitantly a large generator of wastewater, since large amounts of water must be used to remove dirt, herbicides, fungicides, and pesticides from the skin of fruits and vegetables prior to packing and shipping to stores or canning facilities. In general, ozonized water is desirable in the food processing environment because of its disinfecting properties. Since a large amount of water must be used in such operations, significant savings can be realized if this water can be cleaned up and reused.

However, each of the aforementioned unit processes can only partially purify this contaminated water. In general, a feasible water treatment system must involve the use of several unit processes in order to sufficiently clean up the water so that it can be recycled. Such a treatment system is often custom designed and is usually expensive.

Accordingly, a need exists for an economical process and apparatus for cleaning and recycling the wash water used in citrus and vegetable packing facilities.

SUMMARY OF THE INVENTION

We have found that the use of the unit operations of flotation coagulation/clarification and ozonization in a particular configuration results in the economical and efficient cleanup of wastewaters that are generated when agricultural products are washed. In particular, the present invention provides a particularly desirable process and apparatus for sufficiently cleaning fruit and vegetable packing facility wastewater so that it can be recycled for reuse.

In one aspect the invention provides a method of decontaminating a wastewater containing a plurality of contaminant species comprising: treating the wastewater with an effective amount of a coagulant so that at least one contaminant specie is coagulated, whereby the coagulant and the coagulated contaminants are capable of floating; feeding the treated wastewater to a first coagulation station; providing a first station overflow and a first station underflow in the first station whereby the first station overflow contains a relatively higher amount of the coagulant and of the coagulated contaminants than does the first station underflow; feeding the first station underflow to at least a second station coagulation vessel; providing a second station overflow and a second station underflow in the second station whereby the second station overflow contains a relatively higher amount of the coagulant and of the contaminants than does the second station underflow; generating a source of ozone with an ozone generator; and treating the second station underflow, or the final station underflow, with the source of ozone, whereby the ozonized second station underflow provides a source of decontaminated wastewater.

Preferably, the wastewater is first collected in a storage tank whereby an effective amount of the coagulant is added to the wastewater during the feeding of the wastewater from the storage tank to the first coagulation station. Preferably, the second or final station overflow is returned to the storage tank.

The coagulant can be any appropriate chemical or combination of chemicals, and should be selected for the particular contaminants and conditions of the wastewater that is being treated. It is known in the art that no single coagulant is useful for all contaminants and conditions, and that the presence of multiple contaminants can greatly complicate the selection of the coagulant. Several different compounds will sometimes be necessary to adequately remove the contaminants, and the selection process can require repeated trials.

An anionic polyacrylamide, in combination with a metal salt such as polymerized aluminum chloride or aluminum sulfate, have been found to be preferable in treating wastewater from a particular citrus fruit packing facility. The selection of a suitable coagulant might change, however, even for another citrus fruit packing facility, if the wastewater were to have different contaminants such as pesticides and fertilizers, or different conditions such as pH or mineral content.

In general, the first station overflow comprises a sludge containing coagulated contaminants. Preferably, the sludge is directed gravitationally via an inclined transfer trough into a container. Preferably, between the transfer trough and the container, the sludge passes over a screen or other device capable of de-watering the sludge. A single coagulation vessel can comprise substantially concentric cylindrical inner and outer compartments, as the first and second stations, respectively.

Preferably, the ozonized second or final station underflow passes through an ozone contact enhancer. A preferred ozone contact enhancer causes the water and ozone to take a back and forth tortuous path which enhances the mixing and the contact of the ozone with the water. After passing through the enhancer, the ozonized second station underflow is preferably directed to a vented ozone contact tank. The ozone is preferably vented from the contact tank to the storage tank. The storage tank can be a sump tank located below grade.

In another aspect of the inventive process, the de-contaminated wastewater is recycled to a food product cleaning station for use in cleaning the outer surface of the food product. A further aspect of the inventive process involves recovering the wastewater which is reused in the food product cleaning station.

Another aspect of the invention provides an apparatus for de-contaminating a wastewater comprising: structure for treating the wastewater with an effective amount of a coagulant; a coagulation vessel having at least first and second compartments, each compartment being provided with underflow and overflow outlets, whereby the first compartment underflow outlet is in fluid communication with the second compartment and is adapted for fluid flow from the first compartment to the second compartment; structure for feeding the treated wastewater to the first compartment; structure for removing coagulated contaminant sludge in the first compartment overflow; an ozone generator; and an ozone contactor.

Preferably, the apparatus further comprises a storage tank for collecting the wastewater and a feed line connected to the storage tank for feeding the wastewater to the first compartment. A device for introducing the coagulant into the feed line is provided. It is preferred that the apparatus includes a line for returning the second or final compartment overflow to the storage tank.

Sludge removal structure is preferably included for removing sludge in the first compartment overflow. The sludge removal structure may conveniently include a transfer trough adapted for gravitational conveying of the sludge from the first compartment and a container for receiving the sludge. A screen or other device capable of de-watering the sludge can be interposed between the transfer trough and the container.

The invention can comprise any number of coagulation compartments linked in series. The final compartment overflow is recycled and treated again for contaminant removal. The final compartment underflow is contacted with ozone and returned to the washing station to clean more fruits or vegetables. It is presently preferred to use two coagulation compartments, as it is less economical to construct more compartments and two compartments have been found to adequately remove the contaminants from the wastewater.

The first and second coagulation compartments can be provided as separate vessels, but preferably are combined in a single coagulation vessel. The coagulation vessel most preferably comprises substantially concentric cylindrical inner and outer compartments.

The structure for ozonizing the outer compartment underflow preferably includes an ozone contact enhancer having an inlet and an outlet. Preferably, the outlet of the ozone contact enhancer is in communication with a vented ozone contact tank. The ozone contact tank is preferably vented to the storage tank by a connecting line. The storage tank can be a sump tank below grade.

The ozone contact enhancer preferably comprises a first inlet pipe open in a first direction; a second pipe fixedly surrounding the first inlet pipe and opened in an opposed second direction; and a third pipe fixedly surrounding the second pipe and having an outlet in the first direction, the outlet having a cross-sectional size about that of the first inlet pipe.

The apparatus of the present invention can further include a cleaning device for washing the outer surface of a food product which is connected to a line for recycling the ozonized outer compartment underflow. The apparatus can also include a wastewater collector for collecting water used by the food product cleaning device and a line for directing the wastewater to the sump tank.

A primary object of the invention is to provide an economical and efficient wastewater treating process and apparatus. Another object of the invention is to provide a coagulation vessel with a sludge removal device having few moving parts. A further object of the invention is to provide an efficient water/ozone contact enhancer which encourages intimate mixing by virtue of a tortuous fluid pathway.

Still another object of the invention is to provide a space-conscious and cost-conscious water treatment system and method for use in fruit and vegetable packing facilities. These and still other objects and advantages of the present invention will be apparent from the description below.

BRIEF DESCRIPTION OF THE DRAWINGS

There are shown in the drawings embodiments that are presently preferred, it being understood that the invention is not limited to the embodiments or arrangements that are shown, wherein.

DESCRIPTION OF THE PREFERRED EMBODIMENTS

For the purposes of the present invention, wastewater contaminant species may include, for example, pesticides; organics; dirt; heavy metals such as copper, lead, and zinc; microorganisms; and soluble and insoluble inorganics. A particular focus of the present invention is the cleanup and recycling of wastewaters generated by the cleaning of fruits and vegetables in packing facilities. One preferred system of the present invention includes a food product washing station wherein the wash water is recovered as wastewater and sent to the wastewater treatment system of the present invention and then recycled to the food product washing station for reuse.

The present invention will be described in detail with particular reference to the use of ozonized wash water to clean the exterior surfaces of fruit and vegetable products in a packing facility. Typically, a large amount of water must be used in such operations, and therefore significant savings are realized if the water can be recirculated. Also, there is a growing environmental concern about releasing this water unless it is cleaned up first, in which case it would best be reused.

Figure 1:
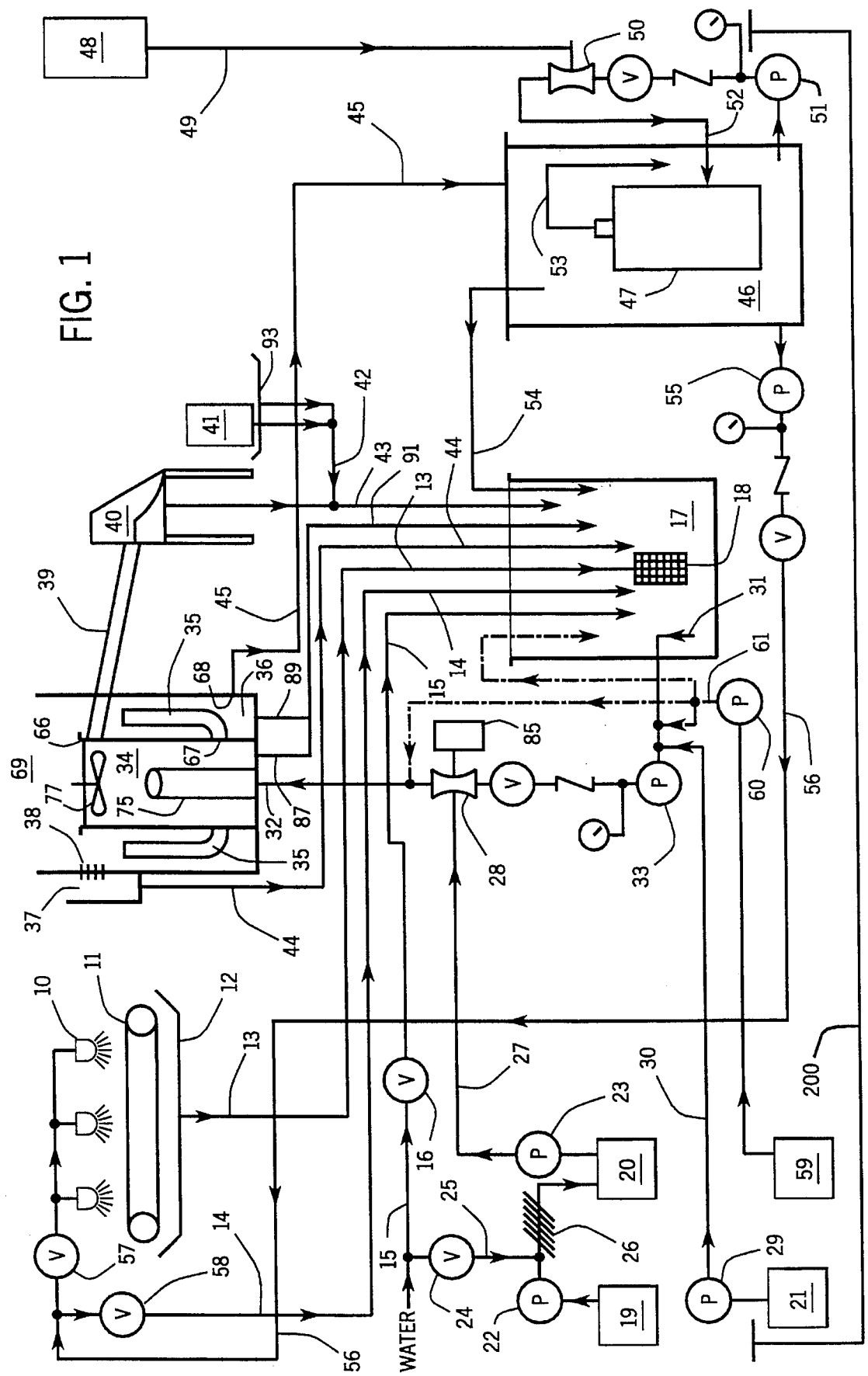
FIG. 1 is a schematic of the overall equipment and flow system of one example of a fruit and vegetable packing facility wastewater treatment system according to the invention.

Referring now to FIG. 1, a plurality of nozzles 10 spray clean ozonized water on the exterior surfaces of fruits and vegetables which are conveyed past the spray nozzles by conveyer 11 or by other suitable material handling equipment. The wash water removes dirt, pesticides, herbicides, and fungicides from the surfaces of the fruits and vegetables. Thus, the spent wash water becomes contaminated with these and other contaminant species.

The contaminated wastewater is then recovered in suitable structure such as a catch basin 12. The recovered wastewater is then conveyed to sump tank 17 or other storage device via line 13. A screen 18 can be provided over the wastewater inlet at the sump tank to catch bits of leaves, stems, and other gross particulates. Make-up water line 15 is provided in order to supply water to the sump tank to compensate for any water loss due to spillage, evaporation, and residual water carried away by the food products. A valve 16 is provided on the make-up water line 15 to control the addition of water. The valve may be operated by a solenoid that is controlled by a level control in the sump tank (not shown). Water in sump tank 17 is then conveyed by pump 33 via lines 31 and 32 to the inlet of a first coagulation compartment 34 of a coagulation vessel 69.

The wastewater in lines 31 and 32 is treated with a coagulant. The coagulant is selected for the particular contaminants and conditions in the wastewater. In a particular citrus packing facility, an anionic polyacrylamide was used with a metal salt. The metal salt is preferably polymerized aluminum chloride or aluminum sulfate. The polymerized aluminum chloride is preferably a polyaluminum chloride solution manufactured by Courtney Industries, Inc. of Baltimore, Md. having the formula $Al_2(OH)_{2.7}Cl_{3.3}$. The anionic polyacrylamide is preferably MAGNIFLOC 1883A flocculent manufactured by CYTEC (American Cyanamid).

A pH adjustment may be necessary for effective removal of one or more of the contaminants. An acid or a base such as sodium hydroxide can be injected from a supply 59 by a pump 60 and a line 61 into either line 31 carrying wastewater toward the coagulation vessel 69, or elsewhere in the process, such as the line 32 or the sump tank 17 (phantom lines). A pH controller is advantageously used to control the addition of the acid or base.

The following preferred dosages were found to apply for the particular citrus packing facility that was studied. It will be appreciated, however, that these dosages could change with changes in the composition of the wastewater. The preferred dosage of aluminum chloride is about 30 to about 200 ppm, based upon the volume of liquid flowing from the sump tank 17 to the coagulation vessel 69. The preferred dosage of aluminum sulfate is about 300 to about 750 ppm. The preferred dosage of polyacrylamide is about 5 to about 50 ppm, and most preferably about 10 ppm. The polymer is preferably first mixed with water and allowed to stand for at least about ten minutes. The preferred concentration of MAGNIFLOC 1883A in this solution is about 0.5% to about 1% by volume.

Other coagulants may also be used. For example and without limitation, some effective coagulants are disclosed in U.S. Pat. Nos. 4,108,768; 4,425,238; 5,071,587; 5,077,314; and 5,238,579, supra. Other examples of coagulants are resin amines (such as MAGNIFLOC 515C), polyamines (such as MAGNIFLOC 572C), and Poly DADM (Diallyl Dimethyl Ammonium Chloride, also called "DADMAC") (such as MAGNIFLOC 587C), and polyacrylamide/copolymers including anionic (such as MAGNIFLOC 1883A), cationic (such as MAGNIFLOC 1598C or 2081C), and nonionic (such as MAGNIFLOC 1986N). All "MAGNIFLOC" products are produced by American Cyanamid.

The injection systems for the coagulants are as follows. The polymer in tank 19 is removed by pump 22. Water can be introduced into the pump discharge through line 25 and the water flow can be controlled by valve 24. The water and coagulant can be thoroughly mixed by passing through a suitable device such as static mixer 26. A suitable static mixer is the Model 005-081 manufactured by TAH Industries, of Robinsville, N.J. The mixed polymer can then enter polymer day tank 20 ready for use. Mixed polymer is removed from the day tank 20 by pump 23 through line 27 where the polymer treats the wastewater pumped from the sump tank 17.

A gas can be added to the wastewater stream to cause the coagulant and contaminant to float. Should a coagulant be used that will float without the assistance of a gas, the gas will not be necessary. The gas is preferably air, although other gases are possible, and can be supplied by gas source 85. Ozone can be used in whole or in part to treat the wastewater before it enters the coagulation vessel. The gas can be introduced from the gas source 85 through a suitable injector 28, which can be positioned prior to, after, or at the same location as the introduction of the polymer.

The aluminum chloride or aluminum sulfate can be stored in tank 21 and injected into line 31 (upstream of pump 33) by pump 29 through a feed line 30. The pH can be adjusted, if necessary, by injecting a suitable compound such as sodium hydroxide from tank 59 into the sump tank 17 or into the transfer line 32 from the sump tank to the coagulation vessel 69. Pump 60 draws sodium hydroxide from tank 59 into the sodium hydroxide feed line 61. The preferred concentration is as needed to maintain the pH at the level necessary for effective contaminant removal, between about 6 and 9 for the particular packing facility that was studied.

A mixed feed of wastewater, coagulant, and possibly pH-adjusting material enter the inner compartment 34 of the coagulation vessel 69 via line 32. The coagulant acts to separate the contaminants from the wastewater. Gas is preferably injected into the wastewater feed such that, upon entering the first compartment 34 of the coagulation vessel 69, the polymer and coagulated contaminants float to the top of the first compartment to form a sludge. As such, the water at the top of the first compartment contains a higher concentration of polymer and coagulated contaminants than does water at the bottom of the first compartment. A riser 75 is preferably used to introduce the wastewater into the first coagulation compartment, most preferably at a point no less than about half the height of the first compartment, to provide for proper separation of contaminants from the wastewater.

The sludge preferably exits the first compartment by falling over a first compartment overflow 66 onto a transfer trough 39. A paddle 77 can be used to keep the sludge moving, particularly after periods of inactivity when the sludge can dry and cake. A screen 40 can be used to dewater the sludge. A presently preferred screen is the Model 160/260 manufactured by Gala Industries, Inc., of Winfield, W. Va. Water removed by the screen is returned to the sump tank via line 43. The de-watered sludge then drops into the sludge container 41 where it is collected for subsequent disposal. Any water settling to the bottom of the sludge container returns to the sump tank 17 via lines 42 and 43. Any water spillage can be collected in a suitable catch basin 93 and returned to the sump tank 17 via the lines 42 and 43.

Purified water passes out of the lower part of the first compartment 34 through a water exit 67. The water outlet 67 should preferably be located near the bottom of compartment 34, and preferably at a distance from the bottom that is no more than about ⅛th of the height of the first compartment 34. The water preferably exits through one or more risers 35 into the second compartment 36. Some sludge will be non-floating and can collect at the bottom of the first compartment. This sludge can be removed to the sump tank 17 through lines 87 and 89, which connect to line 91. A manifold or distributing head can be provided at the exit of the risers 35 to distribute the water throughout the annular second compartment 36. The risers 35 carry the water to a point slightly below the water surface of the second tank and preferably within about the top ⅓rd, and preferably ⅛th, of the height of the second compartment 36. Again, water at the top of the second compartment 36 contains a higher concentration of lighter-than-water polymer and coagulated contaminants than does water at the bottom of the second compartment 36.

Water at the top of the second compartment 36 passes through the second compartment overflow outlet 38 into an overflow weir 37. This water is returned via line 44 to the sump tank 17. Purified water is removed from the bottom of the second compartment 36 through an outlet 68 and is relatively free of polymer and coagulated contaminants. This underflow is transferred to the ozone contact tank 46 via line 45.

Clarified wastewater can be removed from the ozone contact tank by pump 51 and passed through injector 50 and then returned to the contact tank via line 52. Injector 50 injects ozone via line 49 from the ozone generation apparatus 48. The injector 50 is preferably a Venturi Model 1584 manufactured by Mazzei Injector Corporation of Bakersfield, Calif. Ozone generation apparatus 48 preferably includes air compression and air separation apparatus leading to an ozone generator. The compression/separation preferably produces 95% oxygen in which the humidity is reduced to about a −115° F. dew point. A preferred compression/separation device is the Model AS80 manufactured by Airsep Corporation of Buffalo, N.Y. The oxygen then goes to a holding tank where it enters an ozone generator. A preferred ozone generator is a Model GTC-2, manufactured by Ozonia, North America, Griffin Division, Lodi, N.J.

Figure 2:
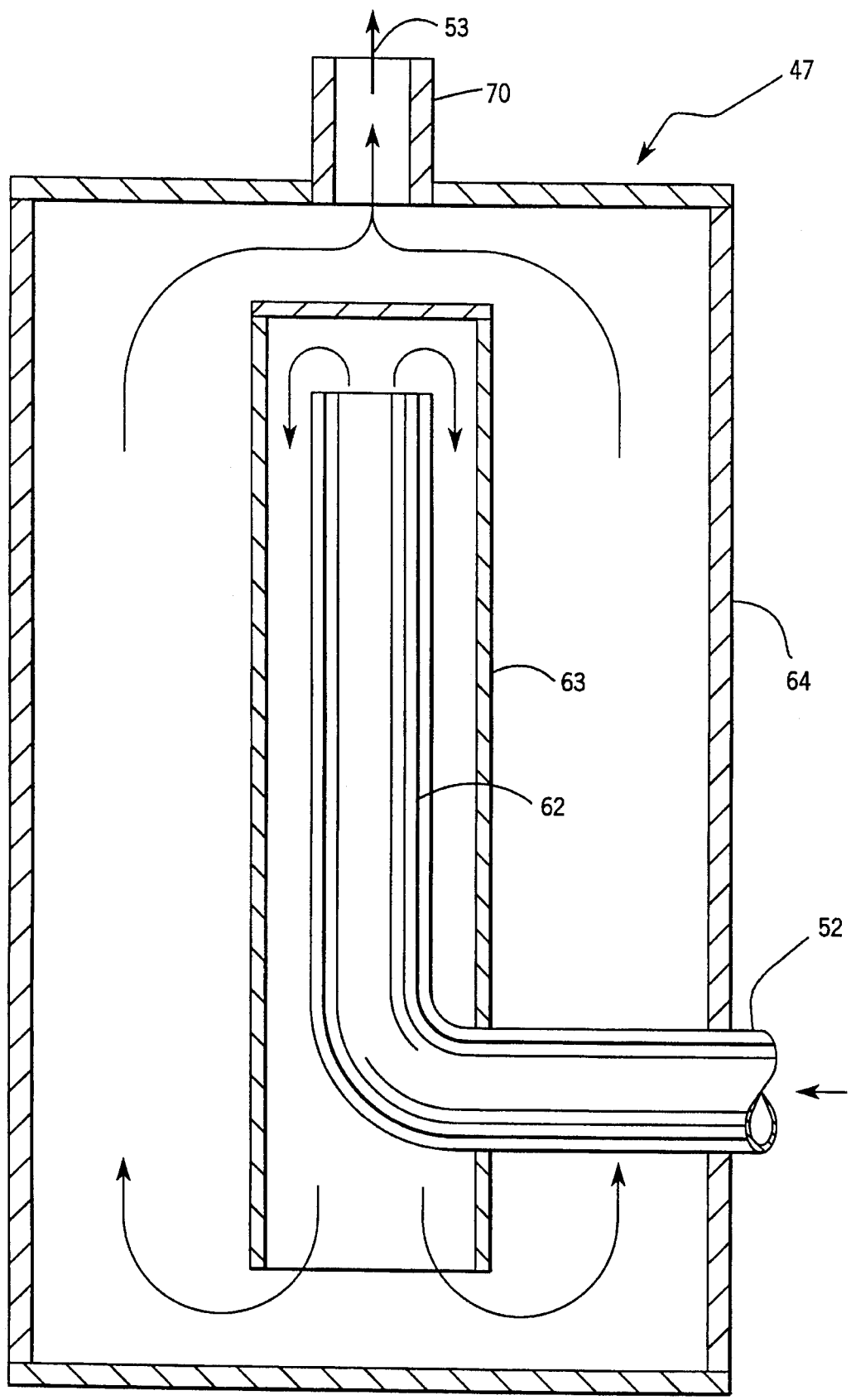
FIG. 2 is a detailed drawing of the preferred ozone contact enhancer of the present invention.

Ozonized water returning from the injector via line 52 enters a ozone contact enhancer 47 wherein the water and ozone gas is subjected to a tortuous path to enhance mixing. Referring to FIG. 2, the ozone/water mixture enters the contact enhancer through inlet riser 62, thence into downward opening pipe 63, and thence into outer container 64 and then leaving the enhancer via outlet 70. The outlet 70 is preferably of about the same cross-sectional size as the inlet riser 62. Preferably, the area around the outlet 70 is designed to avoid collecting or trapping ozone off-gas.

Referring back to FIG. 1, the ozone/water mixture reenters the ozone contact tank 46 through line 53. Ozone off-gas from the contact tank 46 exits the top of the tank through line 54 to the sump tank 17. This ozone acts to form oxides of heavy metals such as copper, lead, and zinc which renders these contaminants insoluble in water so that they will be more easily separated from the water, and will usually be collected with the coagulated contaminants.

Thus, de-contaminated water suitable for reuse is recycled to the food product washing station via pump 55 and return line 56 to the spray nozzles 10. Valves 57 and 58 may be controlled by solenoids and the like so that, when the washing station is not being operated, the de-contaminated water in line 56 is diverted via line 14 to the sump 17. The ozone degrades quickly and, if the water is allowed to stand during the off-periods, the water in the line will not be ozonized. There would be a lag time during each start-up of the system during which water from the line would not be ozonized. Draining this water from the line 56 ensures that only ozonized water is used at the nozzles 10.

Figure 3:
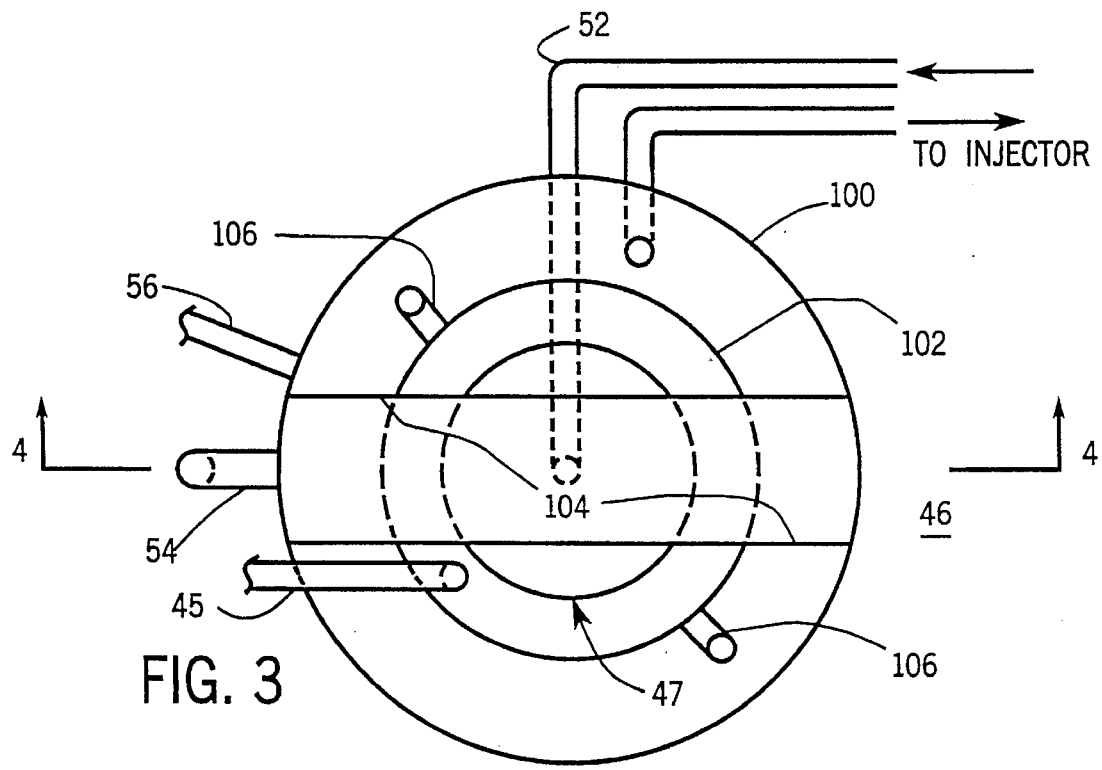
FIG. 3 is a top plan view of an alternative ozone contact tank according to the invention.
Figure 4:
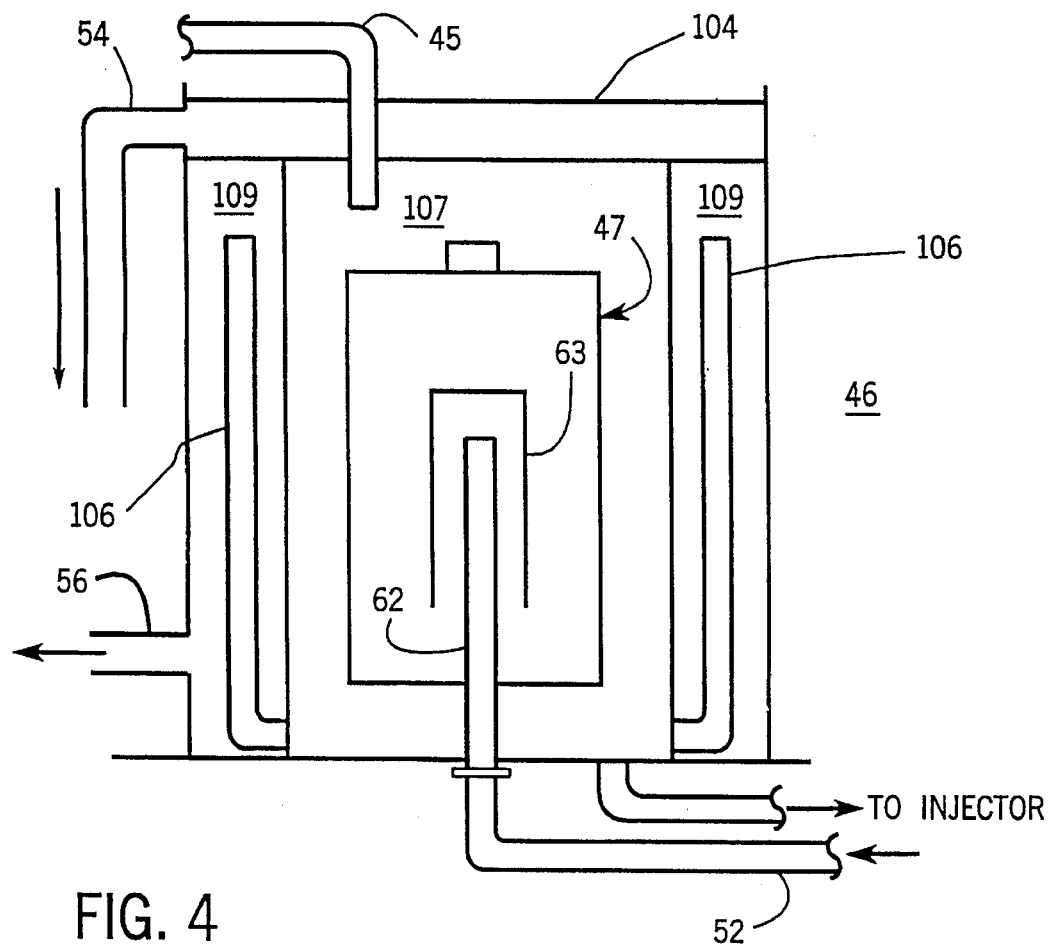
FIG. 4 is a cross-section of the ozone contact tank of FIG. 3.

Foam sometimes appears at the top of the ozone contact tank 46. An alternative ozone contact tank 46, shown in FIGS. 3–4, is designed to remove this foam. First and second contact chambers are formed by outer wall 100 and inner wall 102. The wastewater enters a first chamber 107 through line 45, and is circulated by line 52 through the ozone injector 50. The ozonated water is passed through an ozone contact enhancer 47, which can have pipes 62, 63 as previously described. Foam accumulating at the top of the first chamber 107 of the contact tank 46 passes over a trough 104 and through the line 54 to the sump 17. Water passing from the bottom of the first chamber 107 is transferred by risers 106 to a second chamber 109. The water is released, preferably at a point near the top of the second chamber 109. Water at the top of the second chamber 109 has an increased amount of contaminants, and leaves the top of the second chamber 109 through the transfer trough 104. Water leaving the bottom of the second chamber 109 is purified and is transferred through line 56 to the washing station.

Other features can be included with the invention. A catch basin 200 (FIG. 1) can be built around the sump tank 17 and contact tank 46 to retain leaks or spills in the event of system failure. The catch basin 200 can be an above-ground structure or an in-ground structure.

Although the present invention has been described with reference to certain preferred embodiments, other versions are possible. Therefore, the scope of the claims is not to be limited to the description of the preferred versions contained herein.

We claim:

1. A method for washing agricultural products, comprising the steps of:

(a) applying at least water to wash agricultural products, generating a wastewater having at least one contaminant specie;

(b) treating the wastewater with an effective amount of at least one coagulant so that at least one of said contaminant specie is coagulated, and injecting a gas into said wastewater in concurrent flow;

(c) feeding the treated wastewater to a first coagulation compartment and introducing said wastewater through an inlet at a point in said first coagulation compartment within about the top one-half of the liquid height of the first coagulation compartment;

(d) providing at least one additional successive coagulation compartment, including at least a second coagulation compartment;

(e) providing a first compartment overflow outlet and a first compartment underflow outlet in the first coagulation compartment where the first compartment overflow contains a relatively higher amount of the coagulant and of the coagulated contaminant specie than does the first compartment underflow;

(f) feeding the first compartment underflow by the force of gravity to a second coagulation compartment and introducing said underflow through an inlet at a point in said second coagulation compartment within about the top one-third of the liquid height of the second coagulation compartment, said inlet being lower than said overflow outlet of said first compartment;

(g) providing a compartment overflow and a compartment underflow in the second compartment and in any other additional successive coagulation compartments, whereby each compartment overflow contains a relatively higher amount of the coagulant and of the contaminants than does the respective compartment underflow;

(h) generating a source of ozone with an ozone generator;

(i) treating the compartment underflow from the last of the coagulation compartments with ozone whereby the ozonized final compartment underflow provides a source of de-contaminated waste water; and (j) re-cycling the final compartment underflow, after being ozone treated, to said washing step (a), and the final compartment overflow to upstream of said treatment step (b).

2. The method of claim 1 further comprising, prior to step (b), the step of collecting the wastewater in a storage device.

3. The method of claim 2 wherein step (b) is performed during the feeding of the wastewater from the storage device to the first coagulation compartment.

4. The method of claim 3 wherein the at least one coagulant includes an anionic polyacrylamide and at least one material selected from the group consisting of aluminum sulfate and polymerized aluminum chloride.

5. The method of claim 4 wherein the step (j) comprises returning the final compartment overflow to the storage device.

6. The method of claim 5 wherein the first compartment overflow comprises a sludge containing coagulated contaminants.

7. The method of claim 6 further comprising the step of gravitationally directing the sludge via an inclined transfer trough into a container.

8. The method of claim 7 wherein, between the transfer trough and the container, the sludge passes over a screen capable of de-watering the sludge.

9. The method of claim 8 wherein the first coagulation compartment and a second coagulation compartment are provided as substantially concentric cylindrical inner and outer compartments.

10. The method of claim 9 wherein, during step (i), the last compartment underflow passes through an ozone contact enhancer.

11. The method of claim 10 wherein the final compartment underflow is directed to a vented ozone contact tank after passing through the enhancer.

12. The method of claim 11 wherein vented ozone from the contact tank is directed to the storage device.

13. The method of claim 12 wherein the storage device is a sump tank.

14. The method of claim 13 wherein the ozone contact enhancer comprises a first inlet pipe open in a first direction; a second pipe fixedly surrounding the first inlet pipe and open in an opposed second direction; and at least a third pipe fixedly surrounding the second pipe and having an outlet in the first direction, the outlet having a cross-sectional size about that of the first inlet pipe.

15. The method of claim 14 wherein the wastewater is recovered from a food product cleaning station.

16. The method of claim 15 wherein the de-contaminated wastewater is recycled to the food product cleaning station for use in cleaning the outer surface of food product.

17. An apparatus for washing agricultural products, comprising:

structure operable for applying washing water to agricultural products, generating a wastewater;

structure operable for treating the wastewater with an effective amount of a coagulant;

at least first and second coagulation compartments, each compartment having an underflow and an overflow fluid outlet, each respective compartment underflow being in fluid communication with the next successive compartment;

structure arranged for injecting a gas into the wastewater prior to introduction of the wastewater into the first coagulation compartment;

a line arranged for feeding the treated wastewater to the first compartment and for introducing said wastewater through an inlet at a point in said first compartment within about the top one-half of the liquid height of the first compartment;

structure arranged for respectively introducing said underflow from each preceding compartment to an inlet at a height in each succeeding compartment within about the top one-third of the liquid height of the respective succeeding compartment, the inlet in each succeeding compartment being lower than the overflow outlet in each preceding compartment;

structure arranged for removing coagulated contaminant sludge in the first compartment overflow;

an ozone supply;

a contactor for treating the final compartment underflow with ozone; and structure arranged for returning the ozone treated underflow to the structure for applyiny washing water and for returning fluid from the final compartment overflow to the structure for for treating.

18. The apparatus of claim 17 further comprising a storage device arranged for collecting the generated wastewater and a feed line connected to the storage device and for feeding the wastewater to the first compartment.

19. The apparatus of claim 18 wherein the structure for treating comprises an injector arranged for introducing the coagulant into the feed line.

20. The apparatus of claim 19 further comprising a sludge removal device arranged for removing sludge from the first compartment overflow.

21. The apparatus of claim 20 wherein the sludge removal device includes a transfer trough adapted for gravitational conveying of the sludge from the first compartment overflow and a container for receiving the sludge.

22. The apparatus of claim 21 further comprising a screen capable of de-watering the sludge interposed between the transfer trough and the container.

23. The apparatus of claims 22 wherein the first and second coagulation compartments comprise substantially concentric cylindrical, inner and outer compartments.

24. The apparatus of claim 23 wherein the contactor includes an ozone contact enhancer having an inlet and an outlet.

25. The apparatus of claim 24 wherein the outlet of the ozone contact enhancer is in communication with a vented ozone contact tank.

26. The apparatus of claim 25 further comprising a connecting line from the ozone contact tank vent to the storage device.

27. The apparatus of claim 26 wherein the storage device is a sump tank.

28. The apparatus of claim 27 wherein the ozone contact enhancer comprises a first inlet pipe open in a first direction; a second pipe fixedly surrounding the first inlet pipe and open in an opposed second direction; and at least a third pipe fixedly surrounding the second pipe and having an outlet in the first direction, the outlet having a cross-sectional size about that of the first inlet pipe.

29. The apparatus of claim 28 further comprising a collector for collecting wastewater at a food product cleaning station and for directing the wastewater to the sump tank.

30. The apparatus of claim 29, further comprising a cleaning device for cleaning the outer surface of food, the cleaning device being connected to a line for recycling the ozonized second compartment overflow.

31. The apparatus of claim 17, wherein the ozone contact tank comprises inner and outer concentric tanks, ozonated water being directed into the inner tank and flowing into the outer tank, flow from the top of each concentric tank being returned to the storage device.

* * * * *